US009454408B2

(12) United States Patent
Dutta et al.

(10) Patent No.: US 9,454,408 B2
(45) Date of Patent: Sep. 27, 2016

(54) MANAGING NETWORK UTILITY OF APPLICATIONS ON CLOUD DATA CENTERS

(71) Applicant: International Business Machines Corporation, Armonk, NY (US)

(72) Inventors: Partha Dutta, Bangalore (IN); Vijay Mann, Haryana (IN); Mayank Mishra, Madhya Pradesh (IN); Akanksha Gupta, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 609 days.

(21) Appl. No.: 13/895,470

(22) Filed: May 16, 2013

(65) Prior Publication Data

US 2014/0344440 A1 Nov. 20, 2014

(51) Int. Cl.
*H04L 12/26* (2006.01)
*G06F 9/50* (2006.01)
(Continued)

(52) U.S. Cl.
CPC .......... *G06F 9/5088* (2013.01); *G06F 3/0647* (2013.01); *G06F 9/455* (2013.01); *G06F 9/45558* (2013.01); *G06F 9/4856* (2013.01); *G06F 9/5072* (2013.01); *G06F 9/5077* (2013.01); *G06F 11/1484* (2013.01); *G06F 11/3447* (2013.01); *H04L 12/2602* (2013.01); *H04L 12/5695* (2013.01); *H04L 41/0823* (2013.01); *H04L 41/0896* (2013.01);
(Continued)

(58) Field of Classification Search
CPC ... H04L 67/10; H04L 49/70; H04L 43/0876; H04L 41/0816; H04L 45/586; H04L 67/125; H04L 41/0896; H04L 47/78; H04L 47/70; G06F 9/45533; G06F 9/45558; G06F 2009/4557; G06F 9/4856
See application file for complete search history.

(56) References Cited

U.S. PATENT DOCUMENTS 7,546,308 B1   6/2009  Hu et al.
8,027,354 B1 * 9/2011  Portolani ................ H04L 49/70
                                                370/395.2
(Continued)

FOREIGN PATENT DOCUMENTS

WO         03069848 A1    8/2003

OTHER PUBLICATIONS

Topology Aware VM Migration in Bandwidth Oversubscribed Datacenter Networks : by Jain et al. May 2012 Microsoft Research, Technion, McGill University ICALP.*

(Continued)

*Primary Examiner* — Thomas Dailey
*Assistant Examiner* — Abderrahmen Chouat
(74) *Attorney, Agent, or Firm* — Ryan, Mason & Lewis, LLP

(57) ABSTRACT

Techniques, systems, and articles of manufacture for managing network utility of applications on cloud data centers. A method includes computing a network utility value for each of multiple applications in a data center network, determining a virtual machine placement and an application flow routing within the data center network for each of the multiple applications which have a computed network utility value below a pre-determined network utility threshold, and based on said determining, re-routing one or more of the multiple application flow routings and performing a virtual machine migration of one or more virtual machines associated with at least one of the multiple applications which have a computed network utility value below a pre-determined network utility threshold.

14 Claims, 3 Drawing Sheets

(51) Int. Cl.
| | |
|---|---|
| H04L 29/08 | (2006.01) |
| G06F 11/34 | (2006.01) |
| G06F 11/14 | (2006.01) |
| H04L 12/24 | (2006.01) |
| H04L 12/931 | (2013.01) |
| H04L 12/725 | (2013.01) |
| H04L 12/801 | (2013.01) |
| H04L 12/54 | (2013.01) |
| G06F 9/455 | (2006.01) |
| G06F 3/06 | (2006.01) |
| G06F 9/48 | (2006.01) |

(52) U.S. Cl.
CPC .......... *H04L41/12* (2013.01); *H04L 41/5019* (2013.01); *H04L 45/302* (2013.01); *H04L 47/15* (2013.01); *H04L 49/70* (2013.01); *H04L 67/10* (2013.01); *H04L 67/101* (2013.01); *H04L 67/1008* (2013.01); *H04L 67/34* (2013.01); *G06F 2009/4557* (2013.01); *G06F 2009/45575* (2013.01); *G06F 2201/815* (2013.01)

(56) References Cited

U.S. PATENT DOCUMENTS

| | | | |
|---|---|---|---|
| 8,190,744 | B2 | 5/2012 | Greene |
| 8,862,744 | B2* | 10/2014 | Garg ................ 370/236 |
| 2002/0194324 | A1 | 12/2002 | Guha |
| 2005/0005012 | A1* | 1/2005 | Odhner ............ G06Q 10/06 709/226 |
| 2010/0027420 | A1 | 2/2010 | Smith |
| 2010/0054129 | A1 | 3/2010 | Kuik et al. |
| 2010/0146086 | A1* | 6/2010 | Schwimer ........ H04L 41/0816 709/221 |
| 2010/0287263 | A1 | 11/2010 | Liu et al. |
| 2011/0173302 | A1* | 7/2011 | Rider .............. G06F 9/44505 709/220 |
| 2011/0276951 | A1* | 11/2011 | Jain ................ G06F 11/3006 717/140 |
| 2011/0283278 | A1 | 11/2011 | Murrell et al. |
| 2011/0292792 | A1 | 12/2011 | Zuo et al. |
| 2011/0296052 | A1* | 12/2011 | Guo ................ H04L 45/34 709/240 |
| 2012/0110462 | A1* | 5/2012 | Eswaran .......... G06F 9/5072 715/736 |
| 2012/0179778 | A1* | 7/2012 | DeSwardt ........ H04L 67/06 709/217 |
| 2012/0284398 | A1 | 11/2012 | Durham et al. |
| 2012/0324082 | A1* | 12/2012 | Lee ................ H04L 67/1002 709/223 |
| 2013/0111492 | A1* | 5/2013 | Nojiri ............. G06F 1/206 718/104 |
| 2013/0121149 | A1* | 5/2013 | Guay .............. H04L 47/12 370/231 |
| 2013/0212578 | A1* | 8/2013 | Garg .............. H04L 43/0882 718/1 |
| 2013/0318608 | A1* | 11/2013 | Cho ............... H04L 63/1416 726/23 |
| 2013/0339419 | A1* | 12/2013 | Emaru ............ G06F 9/4856 709/201 |
| 2013/0346572 | A1* | 12/2013 | Jain ............... G06F 9/5088 709/223 |
| 2014/0059228 | A1* | 2/2014 | Parikh ............ G06F 9/5005 709/226 |
| 2014/0258535 | A1* | 9/2014 | Zhang ............ H04L 41/0806 709/226 |

OTHER PUBLICATIONS

Navendu Jain, Ishia Menache, Joseph Naor, and F. Bruce Shepherd. Topology-Aware VM Migration in Bandwidth Oversubscribed Datacenter Networks. May 2012 Microsoft research, ICALP.*

Guo et al. Secondnet: A Data Center Network Virtualization Architecture with Bandwidth Guarantees, ACM CoNEXT 2010, Nov. 30-Dec. 3, 2010, Philadelphia, USA.

Wo et al. Overbooking-Based Resource Allocation in Virtualized Data Center, Object/Component/Service-Oriented Real-Time Distributed Computing Workshops (ISORCW), 2012 15th IEEE International Symposium, Apr. 2012.

Enterasys Networks, Data Center Networking—Managing a Virtualized Environment, 2011.

Gopalakrishnan et al. Fairness & Efficiency in Network Performance Isolation, 2012.

Piao et al. A Network-Aware Virtual Machine Placement and Migration Approach in Cloud Computing, 2010.

Ballani et al. Towards Predictable Datacenter Networks, in ACM SIGCOMM (2011).

Srivastava et al. Application-Aware Virtual Machine Migration in Data Centers, Infocom 2011.

Meng et al. Improving the Scalability of Data Center Networks with Traffic-Aware Virtual Machine Placement, Infocom 2010.

Heller et al. ElasticTree: Saving Energy in Data Center Networks, NSDI 2010.

Carrera et al. Utility-Based Placement of Dynamic Web Applications with Fairness Goals, Network Operations and Management Symposium, 2008. NOMS 2008.

Niu et al. Quality-Assured Cloud Bandwidth Auto-Scaling for Video-on-Demand Applications, INFOCOM, 2012 Proceedings IEEE.

Benson et al. Network Traffic Characteristics of Data Centers in the Wild, IMC.

Chandra et al. Dynamic Resource Allocation for Shared Data Centers Using Online Measurements, in Proceedings of the Eleventh IEEE/ACM International Workshop on Quality of Service (IWQoS 2003), Monterey CA, Jun. 2003.

Gandhi et al. Minimizing Data Center SLA Violations and Power Consumption via Hybrid Resource Provisioning, IGCC, pp. 1-8, 2011 International Green Computing Conference and Workshops, 2011.

Ersoz et al. Characterizing Networks Traffic in a Cluster-based, Multi-tier Data Center, ICDCS, pp. 59, 27th International Conference on Distributed Computing Systems (ICDCS'07), 2007.

Al-Fares et al. Hedera: Dynamic Flow Scheduling for Data Center Networks, NSDI 2010.

Duffield et al. A Flexible Model for Resource Management in Virtual Private Networks, in ACM SIGCOMM (1999).

Kumar et al. Algorithms for Provisioning Virtual Private Networks in the Hose Model, in ACM SIGCOMM (2001).

Xie et al. The Only Constant is Change: Incorporating Time-Varying Network Reservations in Data Centers, in ACM SIGCOMM (2012).

Bari et al. Data Center Network Virtualization: A Survey. IEEE Communications Surveys and Tutorials, IEEE (vol. 15, Issue: 2) Sep. 20, 2012.

Benson et al. S. Cloud-NaaS: A Cloud Networking Platform for Enterprise Applications, in ACM SoCC (2011).

Chen et al. Interactive Analytical Processing in Big Data Systems: A CrossIndustry Study of MapReduce Workloads, in VLDB (2012).

Chen et al. The Case for Evaluating MapReduce Performance Using Workload Suites, in MASCOTS (2011).

Dean et al. Mapreduce: Simplified Data Processing on Large Clusters, in OSDI (2004).

Lam et al. Netshare and Stochastic Netshare: Predictable Bandwidth Allocation for Data Centers, ACM Computer Communication Review 42, 3 (2012).

Rodrigues et al. Gatekeeper: Supporting Bandwidth Guarantees for Multi-Tenant Datacenter Networks, in Usenix Workshop on I/O Virtualization (2011).

Shieh et al. Sharing the Data Center Network, in USENIX NSDI (2011).

Mann et al. VMPatrol: Dynamic and Automated QoS for Virtual Machine Migrations, in CNSM (2012).

Mann et al. Remedy: Networkaware Steady State VM Management for Data Centers, in IFIP Networking (2012).

Mann et al. VMFlow: Leveraging VM Mobility to Reduce Network Power Costs in Data Centers, in IFIP Networking (2011).

* cited by examiner

MANAGING NETWORK UTILITY OF APPLICATIONS ON CLOUD DATA CENTERS

FIELD OF THE INVENTION

Embodiments of the invention generally relate to information technology, and, more particularly, to managing network resources.

BACKGROUND

As data centers (DC) grow in size, the DC network is more commonly identified as a primary performance bottleneck for applications. The network is a prominently shared resource within a DC, as the network is shared by many or all applications. Typically, for example, a network link to a core switch may be shared by flows of many applications, whereas central processing unit (CPU) and memory of a physical machine may be shared by only a small number of applications. Performance of a distributed application depends on the performance of the network connecting its servers and/or virtual machines (VMs).

Accordingly, in an example scenario, paying applications of tenants on a cloud may demand a networking resource reservation in addition to any available compute resource reservation. However, in existing network management approaches, available network reservations are simple and coarse-grained, and do not provide flexibility for tailoring network reservations based on an application's requirement(s) that may vary with time. Moreover, existing approaches for managing network resources in DCs do not take into account the network utility of individual applications.

Consequently, there exists a need for a mechanism to enable reservations for network resources for an application, wherein such a mechanism is aware of application network utility, considers related implications across applications, and responds to any time-varying network demand of the application.

SUMMARY

In one aspect of the present invention, techniques for managing network utility of applications on cloud data centers are provided. An exemplary computer-implemented method can include steps of computing a network utility value for each of multiple applications in a data center network, determining a virtual machine placement and an application flow routing within the data center network for each of the multiple applications which have a computed network utility value below a pre-determined network utility threshold, and based on said determining, re-routing one or more of the multiple application flow routings and performing a virtual machine migration of one or more virtual machines associated with at least one of the multiple applications which have a computed network utility value below a pre-determined network utility threshold.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and configured to perform noted method steps. Yet further, another aspect of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Figure 1:
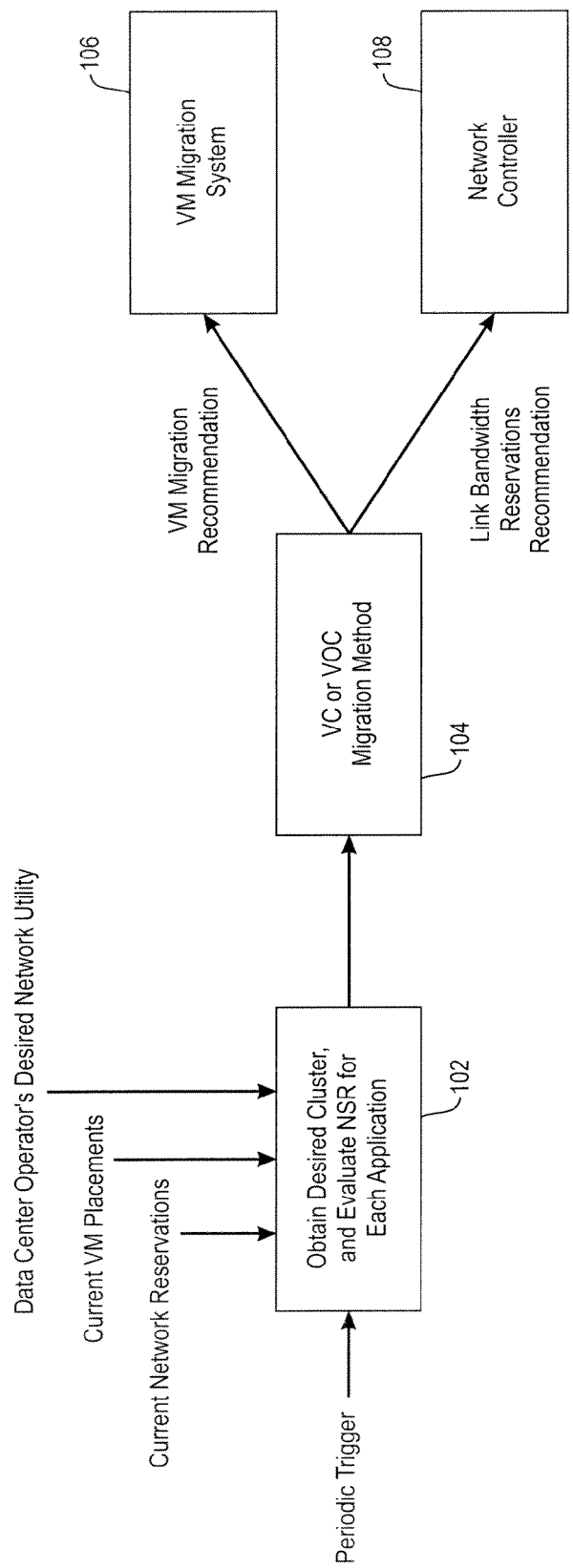
FIG. 1 is a diagram illustrating an embodiment of the present invention.

As described herein, an aspect of the present invention includes techniques for managing network utility of applications on cloud data centers. Network utility of an application, as used herein, refers to a measure of satisfaction that an application derives from a given network reservation in a data center. An example of a network utility metric includes network satisfaction ratio (NSR), which is the ratio of the allocated bandwidth to the desired bandwidth of the application. As detailed herein, at least one embodiment of the invention includes selecting and routing one or more application flows and selecting and migrating one or more virtual machines (VMs) of an application (also referred to herein as application migration) so as to manage the network utility across multiple applications.

At least one embodiment of the invention includes implementing an algorithm for managing the network utility of a tenant's application that includes initial VM placement and flow routing when the virtual cluster is created, as well as subsequent re-routing of flows and a limited number of VM migrations when the desired bandwidths in the virtual cluster are changed by the tenant. Such an embodiment can include incorporating time-varying bandwidth service level agreement (SLA) requirements from different cloud tenants for their applications as well as a tolerance value (for example, a cloud tenant may state that 90% of a desired value is acceptable for an application) to ensure that overall utility (defined as the ratio of the actual bandwidth allocated versus the desired bandwidth) across applications of all cloud tenants is maximized. This can be achieved, as detailed herein, through an abstraction of a virtual cluster (wherein all VMs for an application of a cloud tenant are assumed to be directly connected to a single logical virtual switch), re-routing of network flows and migration of VMs.

At least one embodiment of the invention includes identifying a desired virtual cluster (VC) and/or virtual oversubscribed cluster (VOC) of an application. By way of example, an application, based on its requirements (which can, for example, be estimated based on historical traffic patterns), can specify a desired cluster (VC or VOC) at different points in time. Additionally, at least one embodiment of the invention includes determining the NSR of a virtual cluster placement. Upon obtaining and/or updating the VC and/or VOC of an application, the desired rate of a VM in the application may change, and hence, the allocated to desired bandwidth ratio may change as well.

The NSR (denoted herein also as s) of a cluster (VC or VOC) placement for an application, wherein each virtual link L has bandwidth B_L in the desired cluster and bandwidth A_L in the allocated cluster in the placement, is defined as s=minimum over all L{A_L/B_L}. Additionally, at least one embodiment of the invention includes capturing the utility derived by an application from a given allocation of network resources using NSR. Also, an application-specific utility function can be used to further map NSR to a utility value, and the utility value can be used in place of NSR.

As also described herein, a DC operator's desired network utility can include a threshold ω such that a certain percentage of applications in the data center have a NSR of ω or higher. In an example embodiment of the invention, the desired cluster specifies an ideal bandwidth provisioning for each application for a given period of time, as well as the desired data center operator's network utility threshold ω. Also, in at least one embodiment of the invention, each application and/or cloud tenant can specify its own network utility threshold to control network reservations.

Additionally, given an application placement and corresponding desired cluster, application migration includes determining a new network bandwidth reservation and VM placement such that NSRs of all (or a given percentage of) applications are at least ω while minimizing the number of VM migrations and/or reserving a minimum amount of bandwidth on the links.

FIG. 1 is a diagram illustrating an embodiment of the present invention. By way of illustration, step 102 includes periodically reading a desired cluster and evaluating NSR for all applications therein as follows. For each application, based on the current cluster placement and the desired cluster, the NSR is calculated. The data center operator considers the applications with NSR less than its desired network utility threshold ω (for example, the network utility threshold may be specified by the application or cloud tenant itself). In an example embodiment of the invention, the applications are considered in the ascending order of NSR. Additionally, the operator executes a virtual cluster migration method, as described further below, in step 104 for determining new VM placements and network bandwidth reservations for the application migration.

Based on a resulting recommendation of the migration method, a network controller 108 performs new bandwidth reservation on the links for re-routed application flows, and if required, a VM migration system 106 performs live migration of one or more of the application's VMs (according to the output of the cluster migration method in step 104).

By way of further illustration, consider the following example. For an application A with a desired VC, assume that VM_k has desired bandwidth B_k to the virtual switch and that the current VM placement P on which VM_k is placed is on physical machine P_k. Accordingly, routing is carried out over a tree.

As such, if a physical node (a switch or machine) SW is selected as the virtual switch (VS), and for each VM, a bandwidth of B_k is reserved from the VM_k (placed on P_k) to node SW, then all requirements of the desired VC are satisfied. Let L(SW) be the first link on the path from SW to the highest switch (in the data center topology) in the routing tree of A. If SW is already the highest switch in the tree, at least one embodiment of the invention includes choosing L(SW) as any one of the incident links on SW. Let W1 and W2 be the set of VMs on two components of the routing tree that will be formed if link L(SW) is removed. Accordingly, for a given VM placement, for each choice of SW, define VC-balance (b(SW)) as: minimum {sum of B_k for VMs in W1, sum of B_k for VMs in W2}/(sum of B_k over all VMs).

Also, for a given VM placement, desired VC and routing tree, if the SW is chosen to be a node that maximizes b(SW), the bandwidth required on each edge of the routing tree is minimized. For a given VM placement P, this is referred to herein as SW(P).

In light of the above, at least one embodiment of the invention includes using the following procedure for application VC migration. Let the data center operator's (or specified application) desired network utility be ω, and let M be an upper bound on the number of VM migrations. As used in this example, P=a current VC placement, and V=the list of the first M VMs in ascending order of computed value of (current bandwidth reservation C_k/desired bandwidth B_k). The pre-reservation list=the list returned by ChooseVS(P) (as detailed below). If the pre-reservation list is not null, then VM placement is the VM placement in P and application flows are routed according to the pre-reservation list. In such an instance, a recommendation is returned for a new bandwidth reservation according to the pre-reservation list and a new VM placement according to P.

If the returned pre-reservation list is null, in VC placement P, change the following: VM_k (the first element in list V) is placed on the closest physical machine (PM) x from the current placement P_k which has available bandwidth of (B_k*ω) to SW(P), and other local resources (for example, CPU, memory, etc.) available on x. Also, VM_k is removed from V, and the pre-reservation list is re-computed with the modified VC placement P, and a returned pre-reservation list is used for a new VM placement and routing if the list is not null. The removal of VMs from list V and re-computation of pre-reservation list is continued until a pre-reservation list is found that is not null or V is empty. If V becomes empty before a non-null pre-reservation list is found, then migration of the application VC is thereby not recommended.

At least one embodiment of the invention also includes a procedure for determining and/or choosing a VS and flow routing for a current VC placement P, ChooseVS(P). Consider the following example. For each possible VS placement node SW in the descending order of their VC-balance (b(SW)), and for each VM_k (placed on physical machine P_k) in the descending order of their desired bandwidth B_k, at least one embodiment of the invention includes determining a route R_k from P_k to SW which can support a flow rate of at least (B_k*ω). If no such route can be found, then the current SW is not considered for VS placement, and the next SW in the list of nodes in the descending order of their VC-balance (b(SW)) is considered for VS placement. If a node SW is found for which a route is found from all VMs, then a pre-reservation list of routes R_k is created in which a maximum possible bandwidth is assigned to R_k, subject to a maximum of B_k. Otherwise, the pre-reservation list is set to null. Also, the pre-reservation list is returned by the procedure.

Using the VC migration method as detailed herein, at least one embodiment of the invention can also include implementing the following procedure for application VOC migration. By way of example, let a data center operator's desired network utility threshold be ω, and let M be an upper bound on the number of migrations. Also, let O_k be the bandwidth requirement from VC_k to a root virtual switch (RootVS) in the VOC. Assuming the requirements of each VC, from VS to VMs, are satisfied, if a physical node (a switch or machine) SW is selected as the RootVS for the VOC, and for each VS, bandwidth of O_k is reserved from the from current placement of VS_k to SW, all of the requirements of the desired VOC are satisfied.

In determining VOC-balance (ob(SW)) of switch SW for a possible placement of RootVS (similar to VM-balance), consider the following. Let S1 and S2 be the set of VSs on two components of the routing tree that will be formed if link L(SW) is removed. For a given placement of VCs and for each choice of SW, VOC-balance (ob(SW)) is defined as minimum {sum of O_k for VSs in S1, sum of O_k for VSs in S2}/(sum of O_k over all VSs).

Additionally, at least one embodiment of the invention also includes a procedure for VOC migration. By way of illustration, consider the following example. The proposed VOC placement P1 is set to the current VOC placement, and m is set to M (an upper bound on number of VM migrations). For each VS_k (in virtual cluster VC_k), the number of unsatisfied number of VMs is computed as follows: UnSat_k=the number of VMs in VC_k whose (current bandwidth reservation to VS_k/desired bandwidth to VS_k) <ω. Also, for each VC_k in the descending order of UnSat_k, at least one embodiment of the invention includes computing VCMigration(VC_k, m), which computes the VM migration and flow re-routing that are required for migration of virtual cluster VC_k, given that a maximum of m VM migrations are allowed. Also, the value of in is reduced by the number of VMs that needs to be moved for the migration of VC_k. If m>0, then the changes in VM placement and flow routing that are required for VC_k migration are included in P1 and the next VC is considered for computing VCMigration. Otherwise, no further change in P1 is performed.

Further, a root-pre-reservation list is computed using ChooseRootVS(P1) (as detailed herein). If the returned root-pre-reservation list is not null, a recommendation is returned for a new bandwidth reservation according to the root-pre-reservation-list, in addition to a placement recommendation for each VM. In the situation wherein the root-pre-reservation list is null, and if m>0, an attempt is made to find an alternate placement for each VS_k without increasing UnSat_k. Otherwise, no recommendation for migration of the application VOC is to be provided.

As noted, at least one embodiment of the invention also includes a procedure ChooseRootVS(P1) for choosing a RootVS and routing for the current VS placements. For each possible RootVS placement node SW in the descending order of their VOC-balance (ob(SW)), as well as for each VS_k (placed on physical machine P_k) in the descending order of their UnSat_k, at least one embodiment of the invention includes determining a route R_k from P_k to SW which can support a flow of at least (O_k*ω). If no such route can be found, then the current SW is not considered for RootVS placement, and the next SW in the list of nodes in the descending order of their VOC-balance (ob(SW)) is considered for RootVS placement. If a node SW is found for which a route is found from all VSs, then a root-pre-reservation list of routes R_k is created in which a maximum possible bandwidth is assigned to R_k, subject to a maximum of O_k. Otherwise, root-pre-reservation list is set to null. The root-pre-reservation list is returned by the procedure.

Additionally, in connection with at least one embodiment of the invention, upon receiving a request for a desired VC of an application of a tenant for the first time, an initial placement scheme is used for placing the VMs of the VC, and for reserving link bandwidth for routing the flows of the VC. While taking into account the desired bandwidth and the number of VMs, a bandwidth-aware VC placement algorithm is implemented which includes placing the VC on the lowest sub-tree that can accommodate the VMs and the flows. The scheme can also be extended to handle heterogeneous VM bandwidths and non-tree topologies, while additionally maintaining a minimum level of network utility, as additionally described below.

Addressing heterogeneous VM bandwidths within a VC for initial placement can include, for example, the following steps. While considering a sub-tree for placing the VC or a subset of nodes of VC, in addition to taking into account the number of VM slots of the sub-tree, the number of bandwidth slots is also considered. The bandwidth slot of a sub-tree can be defined, for example, as the largest integer not greater than a number, avl_bw divided by avg_bw, where avl_bw is the available bandwidth of the link from the root of sub-tree to its parent, and avg_bw is the average bandwidth of all the VMs in the VC. The minimum of the two capacities (bandwidth slots and VM slots) determines the number of VMs that can be placed on the sub-tree. If all VMs of the VC with bandwidths reduced by a factor of the minimum level of network utility threshold ω can be placed, the VC is accepted for initial placement; otherwise, it is rejected.

In a non-tree topology, there can be multiple sub-trees with a selected root node and the set of leaf nodes. The number of such possible sub-trees depend on the degree of redundancy in the network links and the number of levels in the sub-tree itself. As the number of such sub-trees can become very large, at least one embodiment of the invention includes considering only a fixed maximum number of such sub-trees and selecting the sub-tree which provides the highest network utility.

After selecting an initial VC placement, an initial virtual switch (VS) is selected from among the nodes in the routing tree. The virtual switch is selected to be the node that has the highest VC-balance.

Additionally, as noted, an application of a tenant may request to change the bandwidth reservation of the flows of VMs. As such, at least one embodiment of the invention includes using a VC and/or VOC migration method, as detailed herein, for changing the bandwidth reservation of the application.

Also, note that the requested increase in the bandwidth reservation may not be fulfilled due to unavailability of bandwidth on the physical links. As a result, the network utility of the VC may decrease over time. This is because, for each application VC, its network utility is computed by comparing the reserved bandwidths with the last desired bandwidths of the VC. On the other hand, the network utility of a VC may also increase if its desired bandwidth decreases. Therefore, at least one embodiment of the invention includes using a periodic utility improvement method.

Periodically, at least one embodiment of the invention includes attempting to improve the network utility of the placed VCs which have a network utility below a predefined tolerance level. In such an embodiment, the VCs are considered one at a time in the ascending order of network utility. For each selected VC, VC migration using application flow re-routing and VM migrations are attempted to improve the network utility, as described herein.

Figure 2:
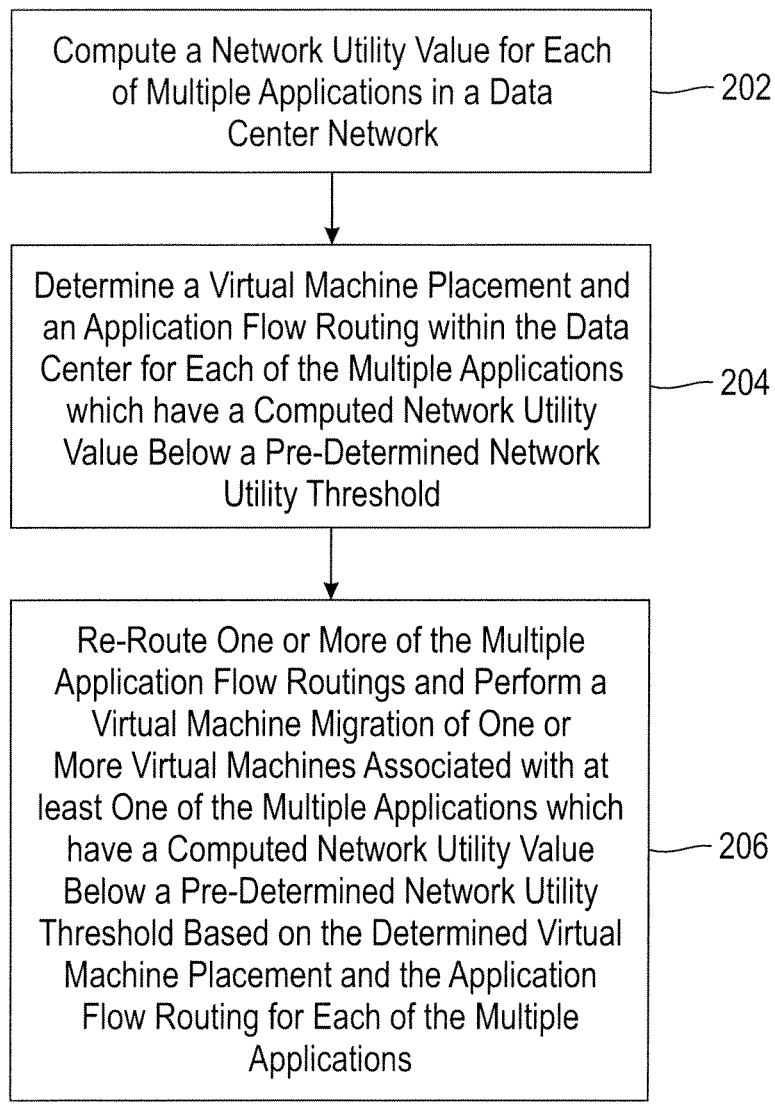
FIG. 2 is a flow diagram illustrating techniques according to an embodiment of the invention.

FIG. 2 is a flow diagram illustrating techniques according to an embodiment of the present invention. Step 202 includes computing a network utility value (also detailed herein as the NSR) for each of multiple applications in a data center network. Computing a network utility value can include obtaining a desired virtual cluster allocation and/or a desired virtual oversubscribed cluster allocation, as well as obtaining a current virtual cluster allocation and/or a current virtual oversubscribed cluster allocation.

Additionally, computing a network utility value can include obtaining each of one or more allocated network bandwidth reservations for each virtual link in the current virtual cluster allocation and/or the current virtual oversubscribed cluster allocation. Further, at least one embodiment of the invention includes computing the network utility value as the minimum of an allocated bandwidth for each virtual link in the current virtual cluster allocation, the current virtual oversubscribed cluster allocation divided by a desired bandwidth for each virtual link in the desired virtual cluster allocation, or the desired virtual oversubscribed cluster allocation.

Step 204 includes determining a virtual machine placement and an application flow routing within the data center network for each of the multiple applications which have a computed network utility value below a pre-determined network utility threshold. The pre-determined network utility threshold can include a network utility value pre-defined by a data center operator or the cloud tenant and/or application owner. Additionally, the determining step can include determining a virtual machine placement and an application flow routing within the data center for each of the multiple applications in ascending order of computed network utility value.

Determining a virtual machine placement can include determining a virtual machine placement in a desired virtual cluster. Determining application flow routing in a desired virtual cluster includes determining a route from a physical machine associated with a given virtual machine in the virtual cluster to a virtual switch with sufficient bandwidth for a given application, as well as cancelling the virtual machine migration if no route with sufficient bandwidth is determined.

Further, determining a virtual machine placement can include determining a virtual machine placement in a virtual oversubscribed cluster. Determining a virtual machine placement in a virtual oversubscribed cluster can include computing the number of unsatisfied virtual machines in the virtual oversubscribed cluster as the number of virtual machines in the virtual oversubscribed cluster for which a ratio between current network bandwidth reservation and desired network bandwidth reservation is less than the pre-determined network utility threshold. Additionally, determining application flow routing in a virtual oversubscribed cluster can include determining a route from a physical machine associated with a given virtual machine in the virtual oversubscribed cluster to a virtual switch with sufficient bandwidth for a given application, determining a route with sufficient bandwidth for a given application, from each virtual switch to the root virtual switch of the virtual oversubscribed cluster, as well as cancelling the virtual machine migration if no route with sufficient bandwidth is determined.

Step 206 includes re-routing one or more of the multiple application flow routings and performing a virtual machine migration of one or more virtual machines associated with at least one of the multiple applications which have a computed network utility value below a pre-determined network utility threshold based on the determined virtual machine placement and the application flow routing for each of the multiple applications.

Additionally, at least one embodiment of the invention includes obtaining one or more network bandwidth reservations associated with each of multiple applications in a data center network, and computing a network utility value for each of the multiple applications in a data center network. Such an embodiment also includes determining a virtual machine placement and an application flow routing within the data center network for each of the multiple applications which have a computed network utility value below a pre-determined network utility threshold. Further, such an embodiment includes performing flow re-routing and, if required, a virtual machine migration of one or more virtual machines associated with at least one of the multiple applications which have a computed network utility value below a pre-determined network utility threshold based on the determined virtual machine placement and the application flow routing for each of the multiple applications, wherein said virtual machine migration maintains at least a pre-determined amount of network bandwidth across one or more links of the determined application flow for the at least one of the multiple applications.

The techniques depicted in FIG. 2 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an aspect of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 2 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code is downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in a computer readable medium having computer readable program code embodied thereon.

An aspect of the invention or elements thereof can be implemented in the form of an apparatus including a memory and at least one processor that is coupled to the memory and configured to perform exemplary method steps.

Figure 3:
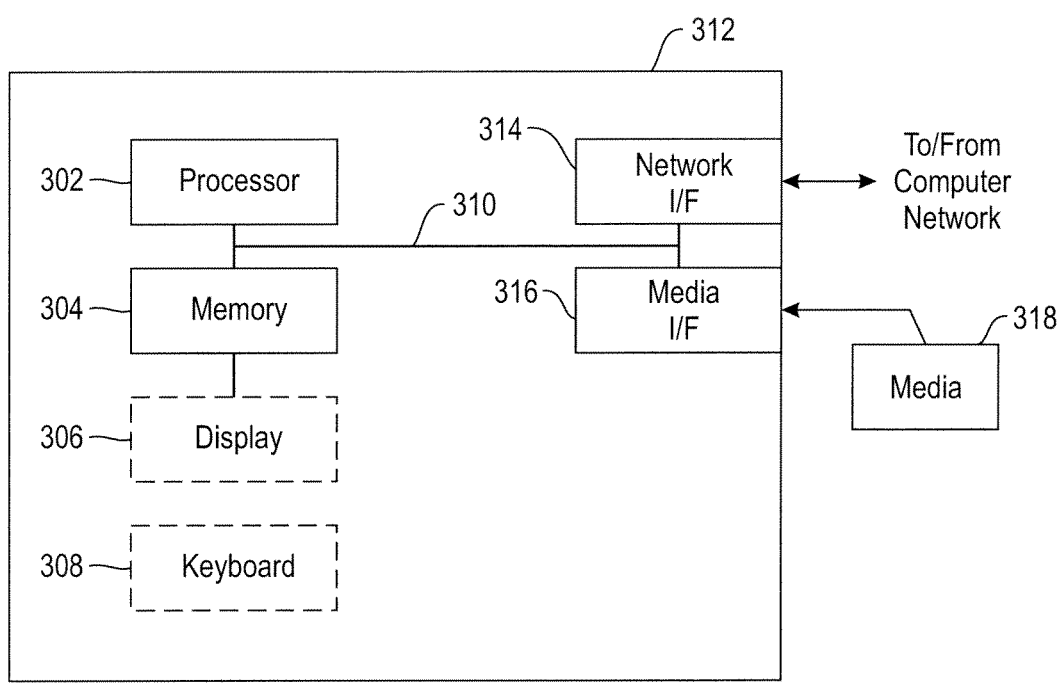
FIG. 3 is a system diagram of an exemplary computer system on which at least one embodiment of the invention can be implemented.

Additionally, an aspect of the present invention can make use of software running on a general purpose computer or workstation. With reference to FIG. 3, such an implementation might employ, for example, a processor 302, a memory 304, and an input/output interface formed, for example, by a display 306 and a keyboard 308. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 302, memory 304, and input/output interface such as display 306 and keyboard 308 can be interconnected, for example, via bus 310 as part of a data processing unit 312. Suitable interconnections, for example via bus 310, can also be provided to a network interface 314, such as a network card, which can be provided to interface with a computer network, and to a media interface 316, such as a diskette or CD-ROM drive, which can be provided to interface with media 318.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 302 coupled directly or indirectly to memory elements 304 through a system bus 310. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 308, displays 306, pointing devices, and the like) can be coupled to the system either directly (such as via bus 310) or through intervening I/O controllers (omitted for clarity).

Network adapters such as network interface 314 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 312 as shown in FIG. 3) running a server program. It will be understood that such a physical server may or may not include a display and keyboard.

As noted, aspects of the present invention may take the form of a computer program product embodied in a computer readable medium having computer readable program code embodied thereon. Also, any combination of computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (anon-exhaustive list) of the computer readable storage medium would include the following: an electrical connection having one or more wires, a portable computer diskette, a hard disk, a random access memory (RAM), a read-only memory (ROM), an erasable programmable read-only memory (EPROM), Flash memory, an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using an appropriate medium, including but not limited to wireless, wireline, optical fiber cable, radio frequency (RF), etc., or any suitable combination of the foregoing.

Computer program code for carrying out operations for aspects of the present invention may be written in any combination of at least one programming language, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, an aspect of the invention includes an article of manufacture tangibly embodying computer readable instructions which, when implemented, cause a computer to carry out a plurality of method steps as described herein.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 302. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed.

At least one aspect of the present invention may provide a beneficial effect such as, for example, selecting one or more VMs for application migration to distribute network utility fairly across multiple applications.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for managing network utility of one or more applications in a data center network, the method comprising:

computing a network utility value for each of multiple applications in the data center network;

determining a virtual machine placement in a virtual oversubscribed cluster and an application flow routing within the data center network for each of the multiple applications which have a computed network utility value below a pre-determined network utility threshold, wherein said determining comprises computing the number of unsatisfied virtual machines in the virtual oversubscribed cluster as the number of virtual machines in the virtual oversubscribed cluster for which a ratio between current network bandwidth reservation and desired network bandwidth reservation is less than the pre-determined network utility threshold; and based on said determining, re-routing one or more of the multiple application flow routings and performing a virtual machine migration of one or more virtual machines associated with at least one of the multiple applications which have a computed network utility value below the pre-determined network utility threshold to the virtual oversubscribed cluster;

wherein the steps are carried out by at least one computer device.

2. The method of claim 1, wherein said determining comprises determining the virtual machine placement and the application flow routing within the data center network for each of the multiple applications in ascending order of computed network utility value.

3. The method of claim 1, wherein said pre-determined network utility threshold comprises a network utility value pre-defined by at least one of a data center operator and an application owner.

4. The method of claim 1, wherein said computing said network utility value comprises:
obtaining a desired virtual oversubscribed cluster allocation; and
obtaining a current virtual oversubscribed cluster allocation.

5. The method of claim 4, comprising:
obtaining each of one or more allocated network bandwidth reservations for each virtual link in the current virtual oversubscribed cluster allocation.

6. The method of claim 1, wherein said determining the application flow routing comprises determining the application flow routing in the virtual oversubscribed cluster.

7. The method of claim 6, wherein said determining the application flow routing in the virtual oversubscribed cluster comprises:
determining a route from a physical machine associated with a given virtual machine in the virtual oversubscribed cluster to a virtual switch with sufficient bandwidth for a given application; and
determining a route with sufficient bandwidth for a given application, from each virtual switch to the root virtual switch of the virtual oversubscribed cluster.

8. The method of claim 7, comprising:
cancelling the virtual machine migration if no route with sufficient bandwidth is determined.

9. An article of manufacture comprising a non-transitory computer readable storage medium having computer readable instructions tangibly embodied thereon which, when implemented, cause a computer to carry out a plurality of method steps comprising:
computing a network utility value for each of multiple applications in a data center network;
determining a virtual machine placement in a virtual oversubscribed cluster and an application flow routing within the data center network for each of the multiple applications which have a computed network utility value below a pre-determined network utility threshold, wherein said determining comprises computing the number of unsatisfied virtual machines in the virtual oversubscribed cluster as the number of virtual machines in the virtual oversubscribed cluster for which a ratio between current network bandwidth reservation and desired network bandwidth reservation is less than the pre-determined network utility threshold; and
based on said determining, re-routing one or more of the multiple application flow routings and performing a virtual machine migration of one or more virtual machines associated with at least one of the multiple applications which have a computed network utility value below said pre-determined network utility threshold to the virtual oversubscribed cluster.

10. The article of manufacture of claim 9, wherein said determining comprises determining the virtual machine placement and the application flow routing within the data center network for each of the multiple applications in ascending order of computed network utility value.

11. The article of manufacture of claim 9, wherein said computing the network utility value comprises:
obtaining a desired virtual oversubscribed cluster allocation; and
obtaining a current virtual oversubscribed cluster allocation.

12. The article of manufacture of claim 11, wherein the method steps comprise:
obtaining each of one or more allocated network bandwidth reservations for each virtual link in the current virtual oversubscribed cluster allocation.

13. A system comprising:
a memory; and
at least one processor coupled to the memory and configured for:
computing a network utility value for each of multiple applications in a data center network;
determining a virtual machine placement in a virtual oversubscribed cluster and an application flow routing within the data center network for each of the multiple applications which have a computed network utility value below a pre-determined network utility threshold, wherein said determining comprises computing the number of unsatisfied virtual machines in the virtual oversubscribed cluster as the number of virtual machines in the virtual oversubscribed cluster for which a ratio between current network bandwidth reservation and desired network bandwidth reservation is less than the pre-determined network utility threshold; and
based on said determining, re-routing one or more of the multiple application flow routings and performing a virtual machine migration of one or more virtual machines associated with at least one of the multiple applications which have a computed network utility value below said pre-determined network utility threshold to the virtual oversubscribed cluster.

14. A method comprising:
obtaining one or more network bandwidth reservations associated with each of multiple applications in a data center network;
computing a network utility value for each of the multiple applications in the data center network;
determining a virtual machine placement in a virtual oversubscribed cluster and an application flow routing within the data center network for each of the multiple applications which have a computed network utility value below a pre-determined network utility threshold, wherein said determining comprises computing the number of unsatisfied virtual machines in the virtual oversubscribed cluster as the number of virtual machines in the virtual oversubscribed cluster for which a ratio between current network bandwidth reservation and desired network bandwidth reservation is less than the pre-determined network utility threshold; and
based on said determining, re-routing one or more of the multiple application flow routings and performing a virtual machine migration of one or more virtual machines associated with at least one of the multiple applications which have a computed network utility value below said pre-determined network utility threshold to the virtual oversubscribed cluster, wherein said virtual machine migration maintains at least a pre-determined amount of network bandwidth across one or more links of the determined application flow for the at least one of the multiple applications;
wherein the steps are carried out by at least one computer device.

* * * * *